Figure 1:
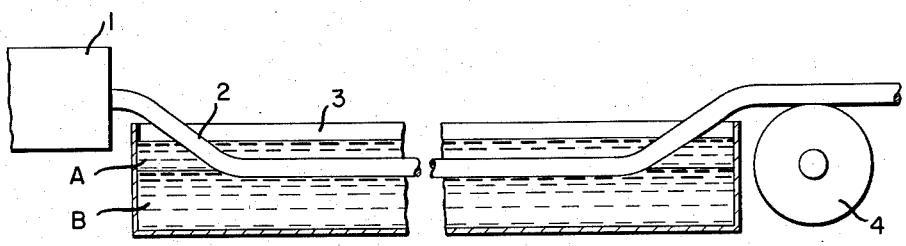
Figure 2:
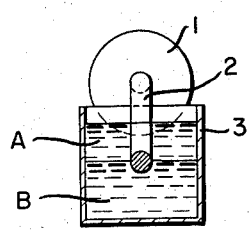

Feb. 14, 1961  M. A. SCHOENBECK  2,971,221
PROCESS FOR CURING CONTINUOUS EXTRUSIONS
OF COMPOUNDED ELASTOMERS
Filed Jan. 30, 1959

*INVENTOR*
MELVIN A. SCHOENBECK

BY
*ATTORNEY*

United States Patent Office 2,971,221
Patented Feb. 14, 1961

2,971,221

PROCESS FOR CURING CONTINUOUS EXTRUSIONS OF COMPOUNDED ELASTOMERS

Melvin A. Schoenbeck, Wilmington, Del., assignor to E. I. du Pont de Nemours and Company, Wilmington, Del., a corporation of Delaware Filed Jan. 30, 1959, Ser. No. 790,234

3 Claims. (Cl. 18—53)

This invention is directed to a novel process for the curing of elastomers. More particularly this invention is directed to a novel process for curing a continuous length of compounded elastomer, such as an extruded gasket.

Continuous lengths of compounded elastomers, in such forms as tubing, coverings for wire, covering bases, and window channels are commonly formed by extrusion through a die and are cured by passage through heated chambers or, more recently, through heated liquid baths, as described in Rubber Age, 83, 88, April 1958. Since the density of the extruded article is usually quite different from that of the curing bath, rather elaborate means must be provided either for keeping the article, as it passes through the bath, from scraping the bottom (of the bath) if it is more dense than the bath liquid or from floating on the top if it is less dense. Since these means for guiding the extrudate must be operated inside the heated bath, they make the equipment rather complicated and troublesome to maintain.

It is, therefore, an object of the present invention to provide a novel process, requiring simple and practical equipment, for the continuous curing of continuously extruded compounded elastomer articles. These and other objects will become apparent in the following description and claims.

More specifically, the present invention is directed to a process for curing a continuous length of extruded elastomeric material by continuously passing it horizontally within the interface between two heated immiscible liquids, one of said liquids being substantially more dense and the other substantially less dense than the compounded elastomer being cured.

The equipment which may be used is shown in Figures I and II. This assembly consists of the extruder 1 from which the compounded elastomer is delivered as a continuous extrudate 2 into the curing tank 3, a long, horizontal trough with closed ends. This tank contains the two immiscible liquids as layers A and B with their interface approximately half-way between the bottom and top. The tank is heated electrically with strip heaters (not shown) applied to the outside of the tank throughout its length. The extrudate 2 floats at this interface without mechanical support and without the need of keeping it submerged. At the far end of the tank it is raised from the bath and removed by the traction roller 4. Auxiliary equipment for the tank, such as drain lines, thermometers and thermoregulators, and a hood and exhaust system, are not shown.

A representative example illustrating the present invention follows.

*Example*

Polychloroprene is compounded as follows and then extruded from a ¼-inch die at the rate of 10 ft. per min. directly into the curing bath described above, 5 ft. long; all parts are by weight.

| | |
|---|---|
| Polychloroprene | 100.0 |
| Stearic acid | 0.5 |
| Magnesium oxide | 2.0 |
| Phenyl alpha-naphthylamine | 2.0 |
| Semi-reinforcing carbon black | 50.0 |
| Di(2-ethylhexyl)sebacate | 20.0 |
| Zinc oxide | 5.0 |
| 2-mercaptoimidazoline | 1.0 |

This stock had a density of 1.33. The lower liquid in the bath is an alloy of 58% bismuth and 42% tin, melting at 281° F. with a density of 8.7 at 68° F. The upper liquid is a high-boiling polyalkylene glycol with a density of 1.04 at 68° F., with flash point of 500° F., stabilized with phenyl alpha-naphthylamine. The bath is kept at 475° F. Since the extrudate moves 10 ft. per min. and the bath is 5 ft long, the extrudate is in the bath for 30 sec., which gives a good cure. After removal from the bath, the cured extrudate is washed with water to remove any adhering polyalkylene glycol. The finished product is then cut into uniform lengths or wound up on reels for storage and shipping. It has a smooth, glossy surface, free from marring.

This curing process may be applied to any properly compounded elastomer. Any speed at which the material is extruded from conventional equipment, up to about 100 ft. per min. is satisfactory for passing the extrudate through the curing bath. Lower speeds are usually more practical, however, since they may be used on shorter baths to get the same residence time. The bath temperature is usually between 300 and 600° F. and preferably between 450 and 500° F., although the high temperatures are entirely satisfactory, since there are no moving parts within the bath.

There is considerable latitude in the choice of both liquid components of the bath but for practical reasons they should have melting points at least 100° F. below the operating temperature and boiling points and flash points at least 25° F. above it. They should be non-toxic and without strong odor and should have no swelling action on the extrudate under operating conditions and should be stable for long periods at operating temperatures exposed to air. Suitable materials for denser phase are low melting alloys, usually containing tin or bismuth or both, such as Wood's metal, bismuth solder and the alloy used in the example, and low melting salts, including hydrates, and very concentrated solutions of salts in water. The chemical classes from which suitable materials for the upper layer are selected vary somewhat with the elastomer but polyalkylene glycols and silicone oils are generally applicable. For polychloroprene and other inherently oil-resistant elastomers, paraffinic petroleum oils and (when sufficiently stable) fatty acid glycerides may be used and have the advantage of low cost. They may be conveniently removed from the extrudate by means of a detergent solution.

The bath may be heated externally by electric heaters or by gas flames or the like or internally by electric immersion heaters. If the sources of heat are well distributed along the length of the trough, stirring is usually unnecessary, especially when an alloy is used.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for curing a continuous length of extruded compounded elastomeric material at atmospheric pressure by continuously passing said material horizontally within the interface between two heated immiscible liquids, the lower liquid layer being substantially more dense than said elastomeric material, the upper liquid layer being substantially less dense than said elastomeric material, but of said immiscible liquid layers having a melting point of at least 100° F. below the operating temperature and a boiling point and flash point at least 25° F. above the operating temperature, said process being operated at a temperature within the range of 300° to 600° F.

2. The process of claim 1 wherein the upper liquid layer is a polyethylene glycol.

3. The process of claim 1 conducted at a temperature within the range of 450° to 500° F.

References Cited in the file of this patent

UNITED STATES PATENTS 2,553,938     Pierce  ------------------ May 22, 1951

UNITED STATES PATENT OFFICE
CERTIFICATION OF CORRECTION

Patent No. 2,971,221 February 14, 1961

Melvin A. Schoenbeck

It is hereby certified that error appears in the above numbered patent requiring correction and that the said Letters Patent should read as corrected below.

Column 3, line 5, for "but" read -- both --.

Signed and sealed this 27th day of June 1961.

(SEAL)
Attest:

ERNEST W. SWIDER
Attesting Officer

DAVID L. LADD
Commissioner of Patents